US012245197B2

(12) United States Patent
Elshafie et al.

(10) Patent No.: US 12,245,197 B2
(45) Date of Patent: Mar. 4, 2025

(54) METHODS AND SYSTEMS FOR RESOURCE POOL AND SIDELINK PRIMARY CELL SWITCHING

(71) Applicant: QUALCOMM Incorporated, San Diego, CA (US)

(72) Inventors: Ahmed Elshafie, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 17/703,573

(22) Filed: Mar. 24, 2022

(65) Prior Publication Data

US 2023/0309063 A1    Sep. 28, 2023

(51) Int. Cl.
*H04W 72/02* (2009.01)
*H04L 5/00* (2006.01)
*H04W 24/08* (2009.01)
*H04W 72/0446* (2023.01)
*H04W 72/20* (2023.01)

(52) U.S. Cl.
CPC ........... *H04W 72/02* (2013.01); *H04L 5/0053* (2013.01); *H04W 24/08* (2013.01); *H04W 72/0446* (2013.01); *H04W 72/20* (2023.01)

(58) Field of Classification Search
CPC . H04W 72/02; H04W 72/0446; H04W 72/20; H04W 72/25; H04W 24/08; H04L 5/0053; H04L 5/001; H04L 5/0055; H04L 5/0094
See application file for complete search history.

(56) References Cited

U.S. PATENT DOCUMENTS

2019/0007974 A1\* 1/2019 Nguyen ................. H04L 67/12
2019/0166601 A1\* 5/2019 Wei ........................ H04L 5/001
2021/0235432 A1\* 7/2021 Zhao .................... H04W 72/044

\* cited by examiner

*Primary Examiner* — Jamal Javaid
(74) *Attorney, Agent, or Firm* — Arent Fox LLP

(57) ABSTRACT

A first device may be configured to implement a procedure for resource pool and sidelink primary cell switching. In some aspects, the first device may transmit, to a second device monitoring a first sidelink resource, a sidelink bandwidth configuration message causing the second device to monitor a second sidelink resource, and switch a primary resource designation from the first sidelink resource to the second sidelink resource, the primary resource designation corresponding to communication of management information and/or acknowledgement information. Further, the first device may communicate, based on the switching, the management information and/or the acknowledgement information with the second device via the second sidelink resource.

14 Claims, 11 Drawing Sheets

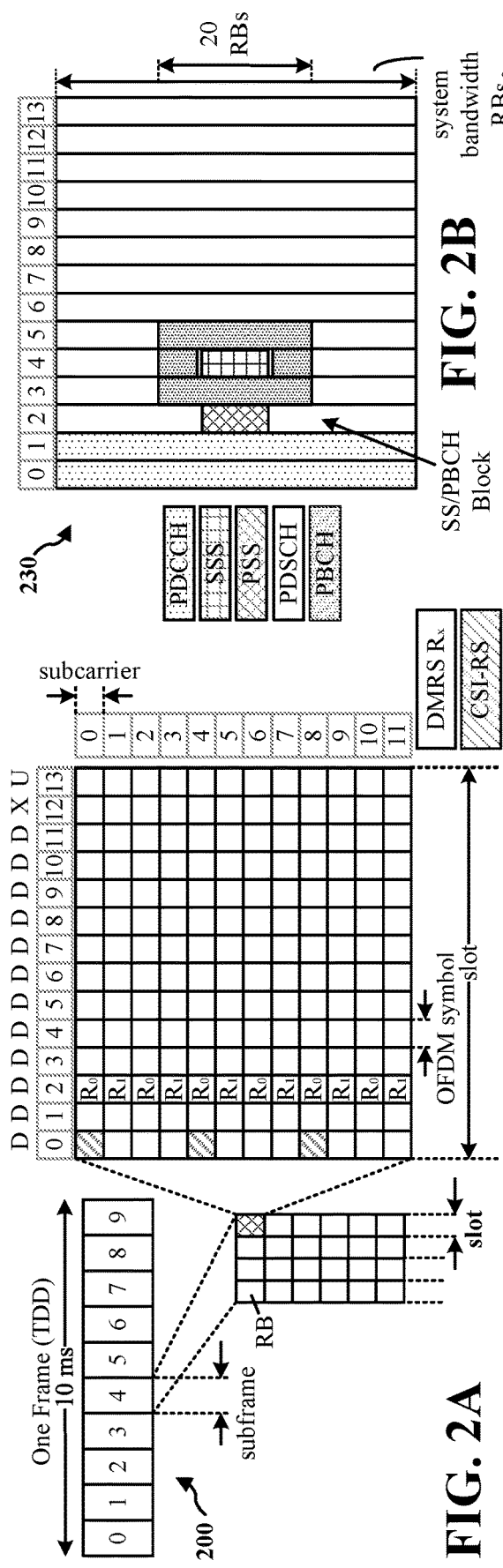
FIG. 2A
FIG. 2B
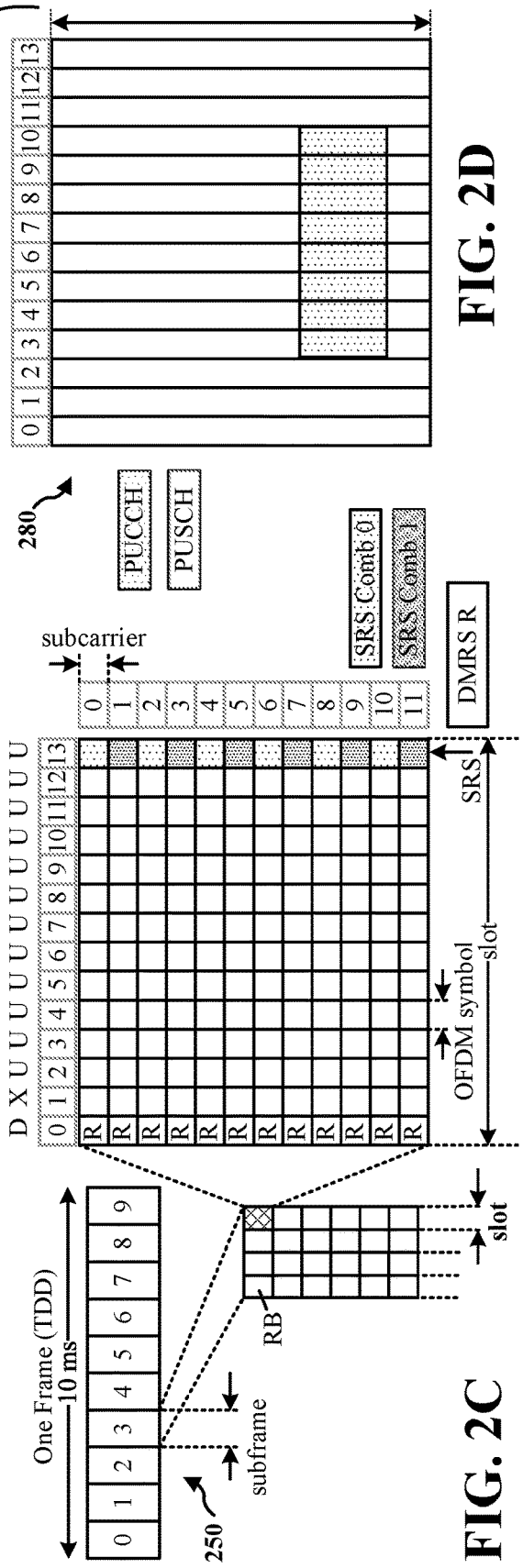
FIG. 2C
FIG. 2D

METHODS AND SYSTEMS FOR RESOURCE POOL AND SIDELINK PRIMARY CELL SWITCHING

BACKGROUND

Technical Field

The present disclosure relates generally to wireless communication, and more particularly, implementing a procedure for resource pool and sidelink primary cell switching.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a first device comprising transmitting, to a second device monitoring a first sidelink resource, a sidelink bandwidth configuration message causing the second device to monitor a second sidelink resource; switching a primary resource designation from the first sidelink resource to the second sidelink resource, the primary resource designation corresponding to communication of management information and/or acknowledgement information; and communicating, based on the switching, the management information and/or the acknowledgement information with the second device via the second sidelink resource.

The disclosure also provides a first device including a memory storing computer-executable instructions and at least one processor configured to execute the computer-executable instructions to transmit, to a second device monitoring a first sidelink resource, a sidelink bandwidth configuration message causing the second device to monitor a second sidelink resource; switch a primary resource designation from the first sidelink resource to the second sidelink resource, the primary resource designation corresponding to communication of management information and/or acknowledgement information; and communicate, based on the switching, the management information and/or the acknowledgement information with the second device via the second sidelink resource. In addition, the disclosure also provides an apparatus including means for performing the above method, and a non-transitory computer-readable medium storing computer-executable instructions for performing the above method.

An example implementation includes a method of wireless communication at a first device comprising receiving a sidelink bandwidth configuration message from a second device managing a first sidelink resource monitored by the first device, switching, based on the sidelink bandwidth configuration message, a primary resource designation from the first sidelink resource to a second sidelink resource, the primary resource designation corresponding to communication of management information and/or acknowledgement information; and communicating, based on the switching, the management information and/or the acknowledgement information with the second device via the second sidelink resource.

The disclosure also provides a first device including a memory storing computer-executable instructions and at least one processor configured to execute the computer-executable instructions to receive a sidelink bandwidth configuration message from a second device managing a first sidelink resource monitored by the first device, switch, based on the sidelink bandwidth configuration message, a primary resource designation from the first sidelink resource to a second sidelink resource, the primary resource designation corresponding to communication of management information and/or acknowledgement information; and communicating, based on the switching, the management information and/or the acknowledgement information with the second device via the second sidelink resource. In addition, the disclosure also provides an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

DETAILED DESCRIPTION

Figure 1:
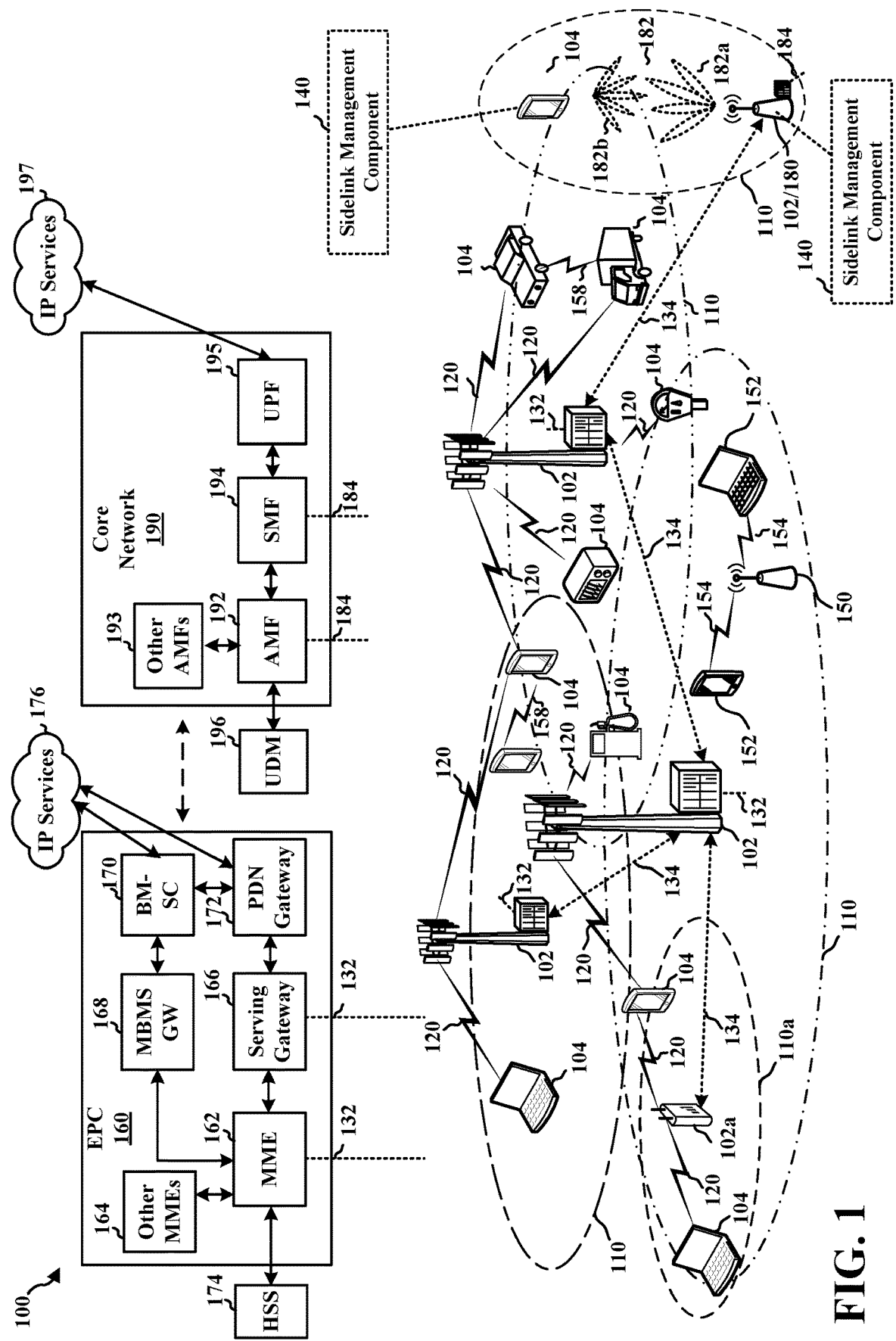
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for resource pool and sidelink primary cell switching. As described herein, "sidelink communications" may refer communication directly between devices without the network. Carrier aggregation is a technique that is used in wireless communication to increase the data rate per user, whereby multiple frequency blocks (i.e., component carriers (CCs)) are assigned to the same device (e.g., user equipment). Further, carrier aggregation also increases the sum data rate of a cell because of better resource utilization. In some aspects, when a network determines the CCs, one component carrier (i.e., the primary component carrier (PCC) may play a more important role than the other(s) (i.e., the secondary component carriers). One thing that distinguishes the PCC from the SCC is that all the uplink data, as well as both control and user data, is sent on the PCC. Further, the cell serving the PCC is called a primary cell (PCell) and a cell serving a SCC is called a secondary cell (SCell). In addition, each cell may include a plurality of resource pools (RPs). As used herein, in some aspects, a "resource pool" may refer to a subset of the available SL resources pre-configured to be used by several UEs for their SL transmissions, and be defined within a sidelink bandwidth part. A RP can be shared by several UEs for their SL transmissions, and UE can be pre-configured with multiple RPs for transmission (transmit RPs) and with multiple RPs for reception (receive RPs). In some carrier aggregation contexts, the resources of one or more CCs may not be needed to perform sidelink communications.

As such, in some aspects, a sidelink transmit device may be configured to perform bandwidth adaptation. As described in detail herein, a device (e.g., a relay UE, primary UE, programmable logic controller (PLC), etc.) may be configured to implement a fast primary resource pool and/or sidelink primary cell switching mechanism to enable prompt dormancy/deactivation of a sidelink secondary cell or a secondary resource pool. Accordingly, in some aspects, a device may be configured to reduce power consumption and complexity, while improving resource utilization by enabling bandwidth adaptation for sidelink communications.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, a sidelink device (e.g., a UE 104) and/or a network entity (e.g., the base station 102/180) may include a sidelink management component 140 configured to align the transmissions and/or receptions of multiple devices by switching the active RP and/or active PCell of the devices.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and Xis flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology µ, there are 14 symbols/slot and 2µ slots/subframe. The subcarrier spacing and symbol length/duration are a function of the numerology. The subcarrier spacing may be equal to $2^{\mu}*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (SR), a power headroom report (PHR), or UCI.

Figure 3:
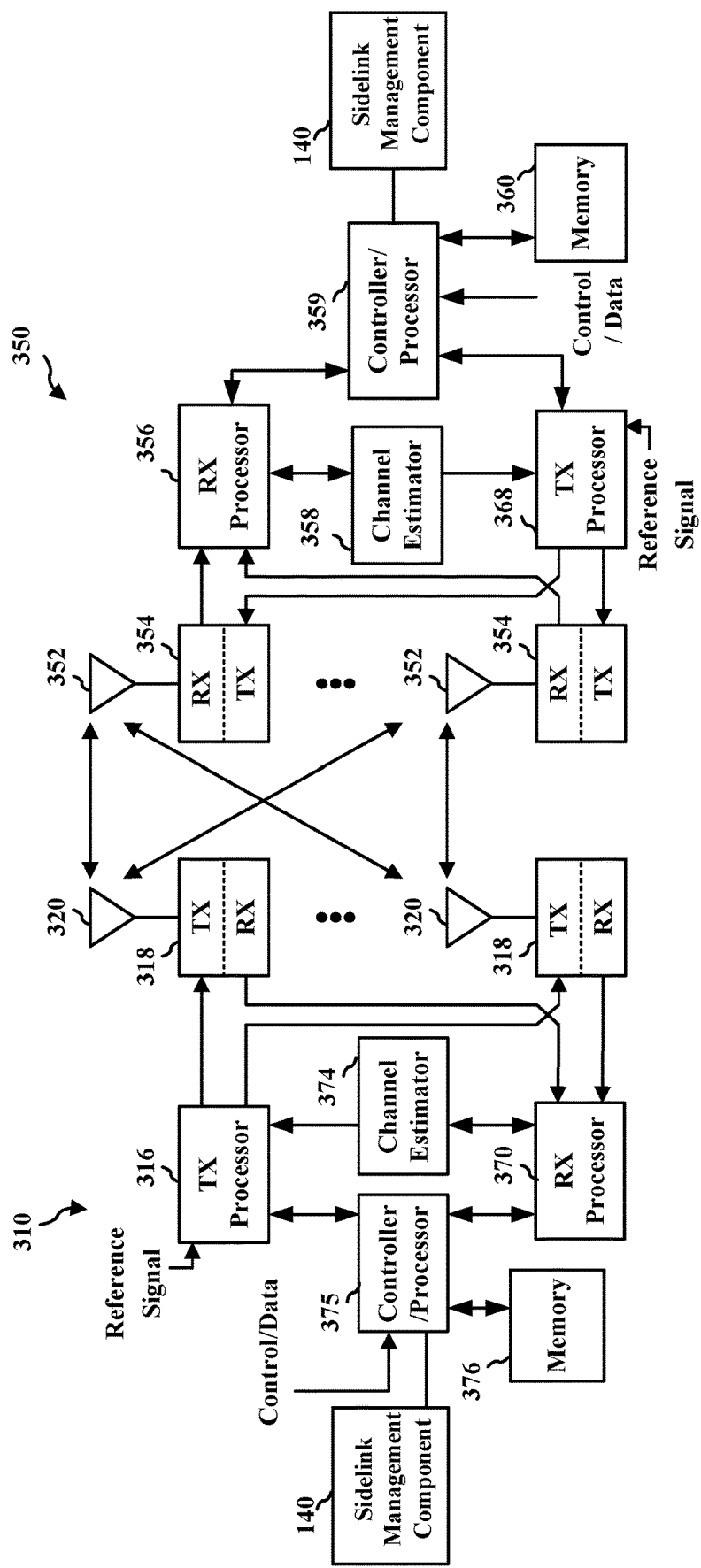
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the sidelink management component 140 of FIG. 1.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
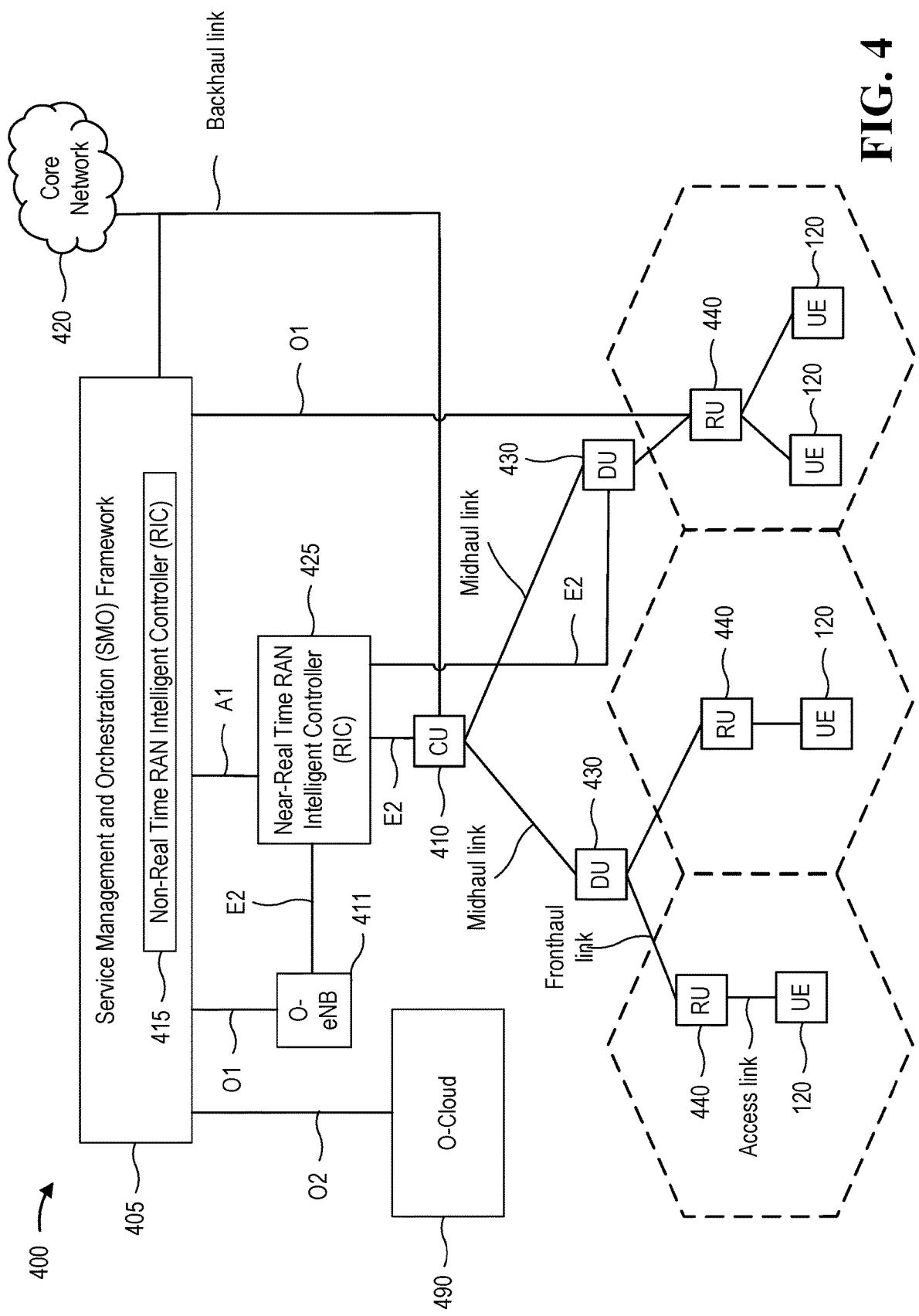
FIG. 4 is a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) MC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT MC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT MC 415 or the Near-RT MC 425 may be configured to tune RAN behavior or performance. For example, the Non-RT MC 415 may monitor long-term trends and patterns for performance and employ AI/ML models to perform corrective actions through the SMO Framework 405 (such as reconfiguration via O1) or via creation of RAN management policies (such as A1 policies).

Referring to FIGS. 5-11, in one non-limiting aspect, a system 500 is configured to implement a procedure for resource pool and sidelink primary cell switching, in accordance with some aspects of the present disclosure.

Figure 5:
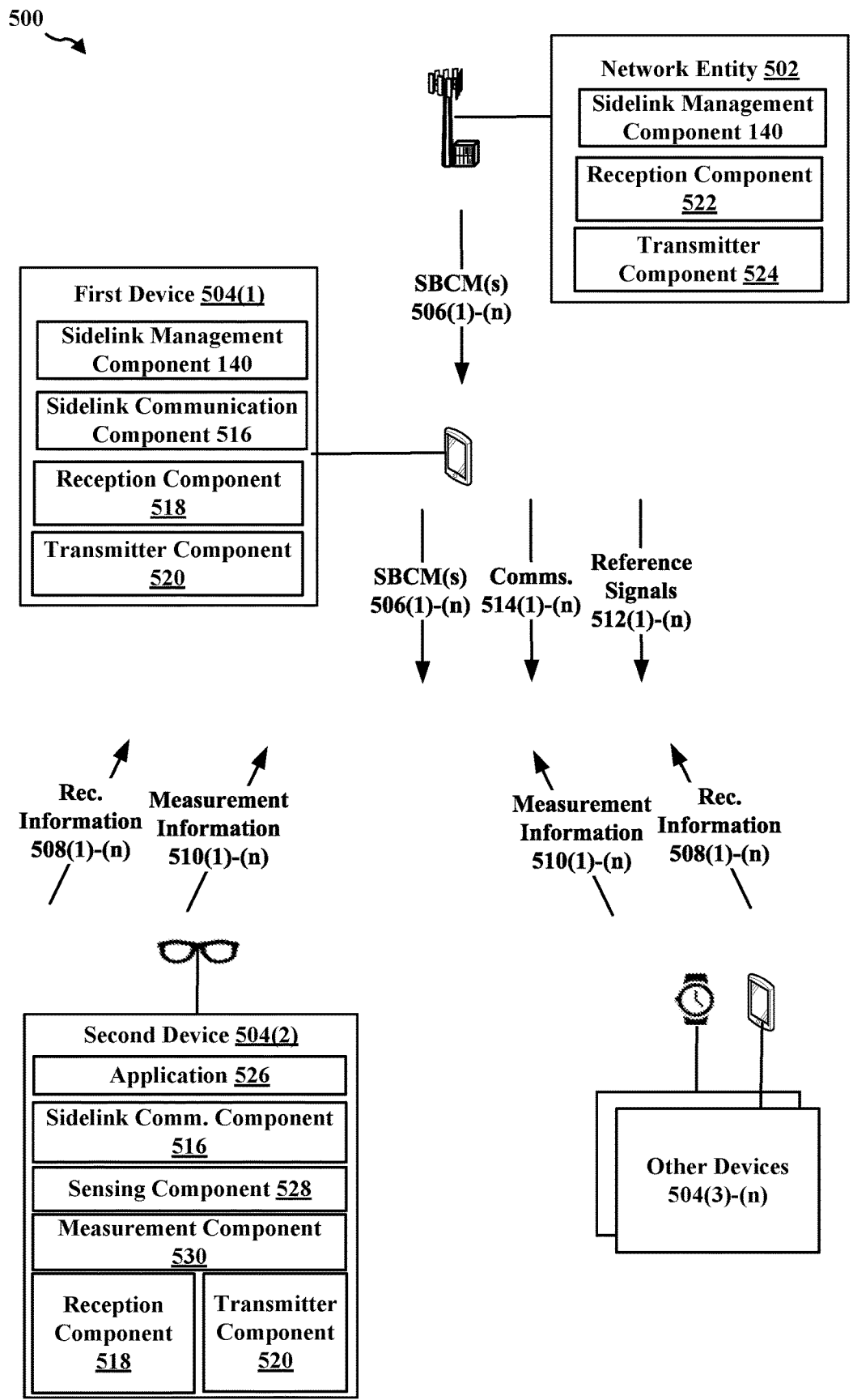
FIG. 5 is a diagram illustrating an example of communications of a network entities and devices, in accordance with some aspects of the present disclosure.

FIG. 5 is a diagram illustrating example communications and components of network entities and devices. As illustrated in FIG. 5, the system 500 may include at least one network entity 502 (e.g., the base station 102/180) and a plurality of devices 504(1)-(*n*) (e.g., the UEs 104). Further, in some aspects, the network entity 502 may serve at least a first device 504(1) (e.g., the UE 104, a PLC, a PLD). Additionally, the devices 504(1)-(*n*) may communicate with each other over via a sidelink. For example, the device 504(1) may be a primary UE or a relay UE in communication with device 504(2) and 504(3). In some aspects, the sidelink communications may be beamformed wireless communications whereby the device 504(1) transmits and receives data via a sidelink with device 504(2) and 504(3). Further, as described in detail herein, device 504(1) may contemporaneously transmit and receive data from the device 504(2) and 504(3) via sidelink communications.

In some aspects, each of the devices 504 may be configured with multiple transmit resource pools and multiple receive resource pools. As used herein, in some aspects, a "resource pool" may refer a plurality of resources (e.g., time and frequency resources) that may be used by the UEs for transmissions and receptions over the sidelink. In some aspects, a resource pool may include contiguous PRBs and contiguous or non-contiguous slots that have been configured for SL transmissions. Further, a resource pool may belong to a bandwidth part. As used herein, in some aspects, a "bandwidth part" (BWP) may be a subset of contiguous RBs on a carrier, and contain a set of resource pools.

As illustrated in FIG. 5, the device 504(1) may include a sidelink management component 140 configured to perform resource pool and sidelink primary cell switching. For example, the device 504(1) may communicate via sidelink with the device 504(2) and the device 504(3). The device 504(2) may use a first sidelink resource, e.g., a resource pool of a first component carrier (CC) as a primary resource pool. The device 504(3) may use a second sidelink resource, e.g., a second resource pool of the first CC as a primary resource pool. As a result, the device 504(2) monitors the bandwidth of the first resource pool and the device 504(3) monitors the bandwidth of the second resource pool. In some aspects, primary resources pools and primary cells are used to activate/deactivate other CCs or resource pools, send HARQ-ACK, and/or receive resource pool and CC information. As used herein, in some aspects, a "sidelink resource" may refer to a resource pool or a cell.

As described herein, in some aspects, the device 504(1) may transmit a sidelink bandwidth configuration message 506(1) to the device 504(2) which causes the device 504(2) to switch the primary resource pool of the device 504(2) from the first resource pool of the CC to the second resource pool. Once the device 504(2) has been switched, the device 504(1) may deactivate the first resource pool, thereby saving power that would have been consumed to provide the second resource pool and freeing up bandwidth. As described herein, in some other aspects, the device 504(2) may transmit recommendation information 508 to the device 504(1). The recommendation information 508 may identify one or more preferred sidelink resources (e.g., resource pools and/or cells) of the device 504(2). In some aspects, the device 504(2) may transmit the recommendation information 508 based on the inactivity on particular sidelink resources, poor channel performance of particular sidelink resources, and/or interference negatively impacting a sidelink resource. For example, the recommendation information 508 may indicate that the device 504(2) would like to switch to the second resource pool or the third resource pool of the CC. Upon receipt of the recommendation information 508, the sidelink management component 140 may select a new primary resource pool for the device 504(2), and transmit a sidelink bandwidth configuration message 506(2) to the device 504(2) which causes the device 504(2) to switch to the new primary resource pool selected by the sidelink management component 140. Once the device 504(2) has been switched, the device 504(1) may deactivate the previously used resource pool of the device 504(2), thereby saving power that would have been used for the resource pool and freeing up bandwidth.

As described herein, in some other aspects, the devices 504(2)-(*n*) may transmit measurement information 510 to the device 504(1). For example, the devices 504(2)-(*n*) may transmit RSRP measurements to the device 504(1) in response to reference signals 512(1)-(*n*) from the device 504(1). In some aspects, the devices 504(2)-(*n*) may transmit periodic measurement information 510(1)-(*n*) or send measurement information 510(1)-(*n*) captured after a predefined offset from receipt of a PSSCH transmission. Upon receipt of the measurement information 510, the sidelink management component 140 may designate a new sidelink resource as primary for the device 504(2) based upon the measurements, and transmit a sidelink bandwidth configuration message 506(3) to the device 504(2) which causes the device 504(2) to switch to the new sidelink resource selected by the sidelink management component 140. Once the device 504(2) has been switched, the device 504(1) may deactivate the previously used sidelink resource of the device 504(2), thereby saving power that would have been used for the resource pool and freeing up bandwidth.

In some aspects, the sidelink management component 140 may transmit the sidelink bandwidth configuration message 506 via layer-1 signaling, layer-2 signaling, or layer-3 signaling transmitted on a primary resource pool or a second resource pool. For example, the device 504(1) may transmit the sidelink bandwidth configuration message 506 via sidelink control information (SCI) (e.g., SCI-2), MAC-CE, RRC, PSSCH, or sidelink wakeup signal (SL-WUS). Further, the sidelink management component 140 may send a sidelink bandwidth configuration message 506 indicating that the device 504(2) should revert back to an earlier primary resource pool or CC via layer-1 signaling, layer-2 signaling, or layer-3 signaling.

Further, once a primary resource pool or primary cell has been switched, the devices 504(1)-(2) may transmit communications 514(1)-(n) that activate/deactivate other CCs or resource pools, send HARQ-ACK, and transmit/receive resource pool and CC information.

In addition, the device 504(1) may include a sidelink communication component 516, a reception component 518, and a transmitter component 520. The sidelink communication component 516 may be configured to perform sidelink communications. The transmitter component 520 may be configured to generate signals for transmission operations as described herein. The transmitter component 520 may include, for example, a RF transmitter for transmitting the signals described herein. The reception component 518 may include, for example, a RF receiver for receiving the signals described herein. In an aspect, the reception component 518 and the transmitter component 520 may be co-located in a transceiver (e.g., the transceiver 810 shown in FIG. 8).

As illustrated in FIG. 5, the network entity 502 may include a sidelink management component 140 for configuring the resource pools and CCs of the system 500. Further, in some aspects, the network entity 502 may also transmit the sidelink bandwidth configuration messages 506(1)-(n) to the device 504(2) either directly or indirectly via the device 504(1). For example, the network entity may transmit a sidelink bandwidth configuration message 506 via DCI (format 3_x), MAC-CE, RRC, or Uu-wake up signal (WUS). As described herein, upon receipt of a sidelink bandwidth configuration message 506, the device 504(2) may switch a primary sidelink resource (e.g., a primary resource pool or primary cell), and the device 504(1) may deactivate the former primary sidelink resource, thereby saving power that would have been used for the former primary sidelink resource and freeing up bandwidth.

In addition, the network entity 502 may include a reception component 522 and a transmitter component 524. The reception component 522 may include, for example, a radio frequency (RF) receiver for receiving the signals described herein. The transmitter component 524 may include, for example, an RF transmitter for transmitting the signals described herein. In an aspect, the reception component 522 and the transmitter component 524 may be co-located in a transceiver (e.g., the transceiver 910 shown in FIG. 9).

As illustrated in FIG. 5, the device 504(2) may include an application 526, a sidelink communication component 516, a sensing component 528, and a measurement component 530. The application 526 may perform one or more tasks on the device 504(2). Further, the sidelink communication component 516 may be configured to perform sidelink communications. The sensing component 528 may be configured to perform sensing operations on resource pools. In addition, the measurement component 530 may measure the quality of a channel between the device 504(1) and the device 504(2) by sounding the reference signals 512(1)-(N) received from the device 504(1).

In addition, the device 504(2) may include the reception component 518 and the transmitter component 520. The transmitter component 520 may be configured to generate signals for transmission operations as described herein. The transmitter component 520 may include, for example, a RF transmitter for transmitting the signals described herein. The reception component 518 may include, for example, a RF receiver for receiving the signals described herein. In an aspect, the reception component 518 and the transmitter component 520 may be co-located in a transceiver (e.g., the transceiver 810 shown in FIG. 8).

Figure 6:
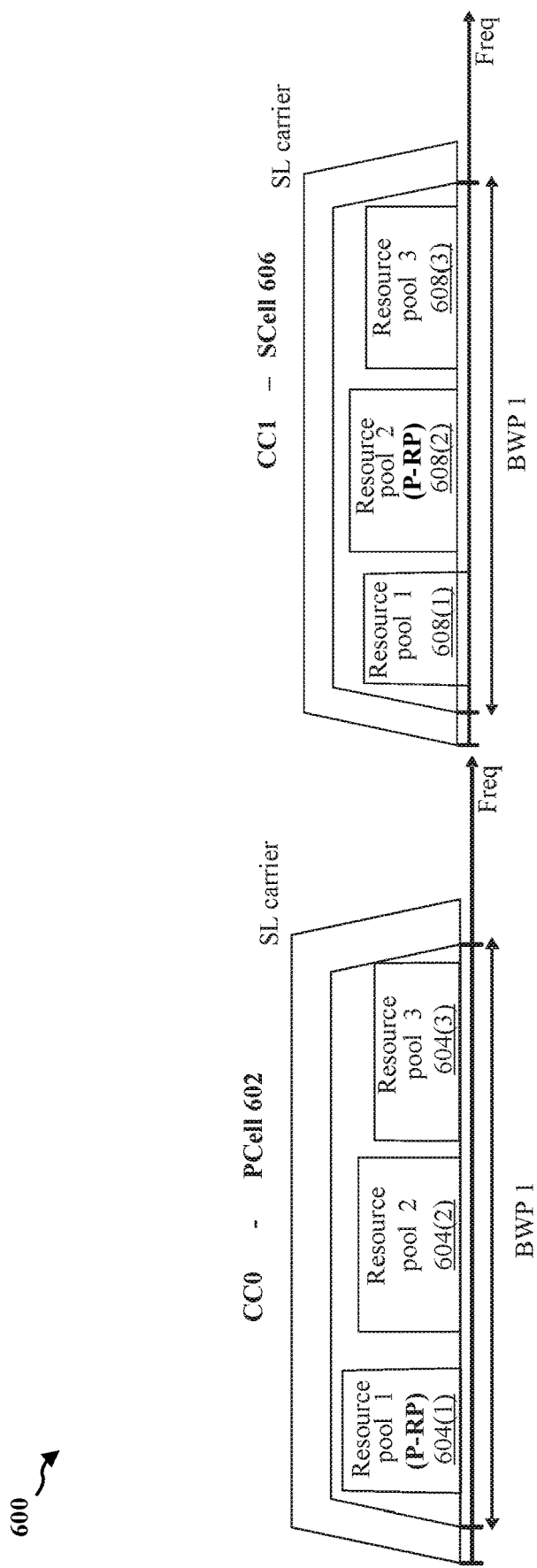
FIG. 6 is a diagram illustrating an example of a primary and secondary cell, in accordance with some aspects of the present disclosure.

FIG. 6 is a diagram 600 illustrating an example of a primary and secondary cell, in accordance with some aspects of the present disclosure. As illustrated in in FIG. 6 a primary cell 602 may include three resource pools 604(1)-(3) with the resource pool 604(1) being the primary resource pool for a particular device 504. Further, a secondary cell 606 may include three resource pools 608(1)-(3) with the resource pool 608(2) being the primary resource pool for the secondary cell 606 for the particular device 504. As described herein, a sidelink device (e.g., a UE, PLC, etc.) may transmit sidelink bandwidth configuration messages 506(1)-(n) to switch the primary cell and/or primary resource pool of another sidelink device.

In some aspects, each device 504 may have a primary resource pool defined for each active BWP of each CC. In some instances, the primary resource pool within a primary CC may control (e.g., activate or deactivate) the other resource pools within the other CCs (i.e., secondary CCs) including the primary resource pool of each of those CCs. Alternatively, each primary resource pool within a CC can control (e.g., activate or deactivate) all the secondary resource pools within the CC, and the primary resource pool within the primary CC can control only the primary resource pools of all other CCs.

In some aspects, if a primary resource pool within a secondary CC is deactivated by the first device 504(1), the primary resource pool within the primary CC can be used for direct communication about the other resource pools across the deactivated primary resource pool within the secondary CC. In some other aspects, if a primary resource pool of a secondary CC is deactivated, the first device 504(1) may select a primary resource pool from another CC (e.g., primary or secondary) or one of the secondary resource pools within the secondary CC to control the secondary resource pools within the secondary CC.

Figure 7:
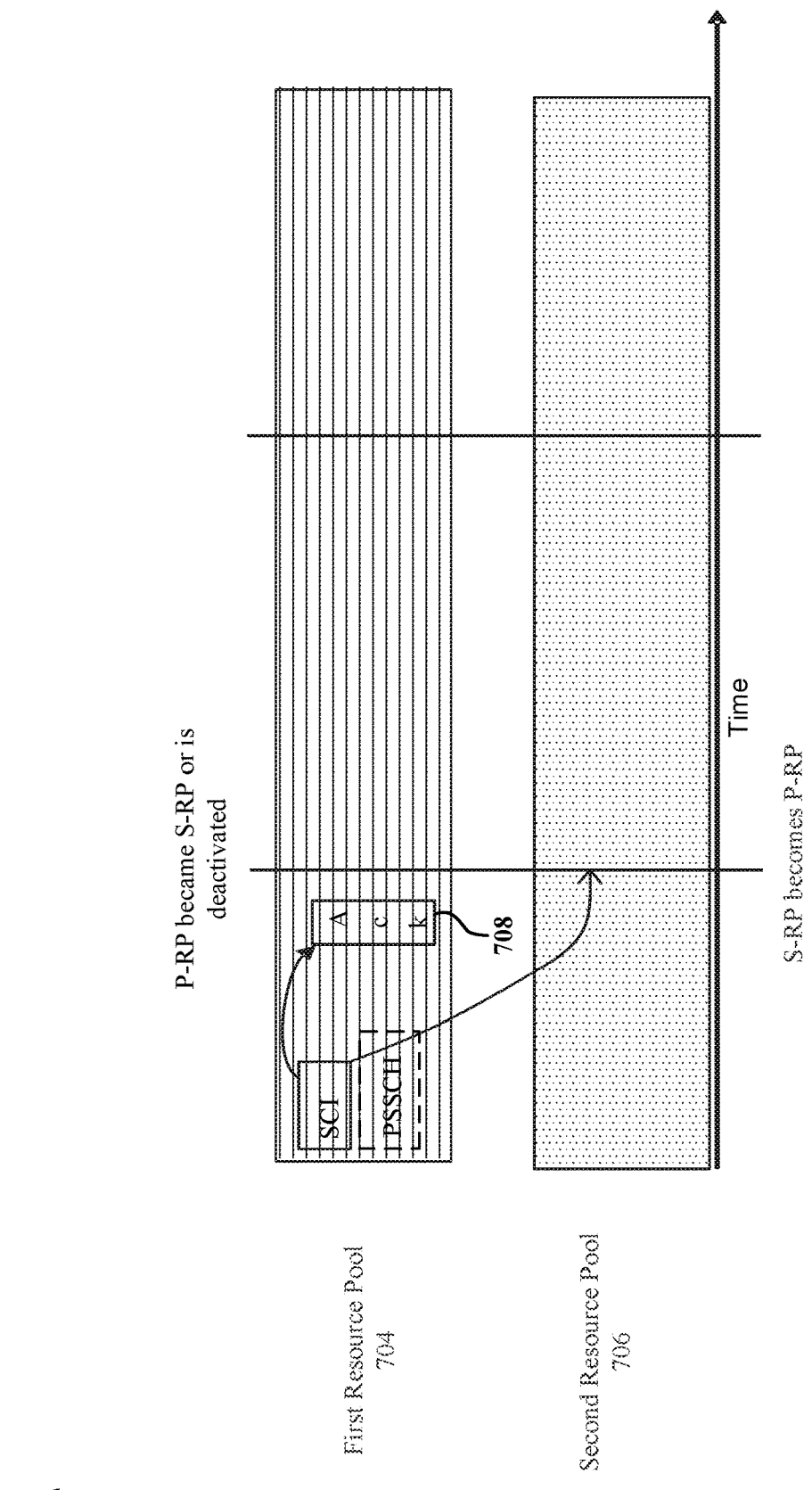
FIG. 7 is a diagram illustrating an example of a transition from a first resource pool to a second resource pool, in accordance with some aspects of the present disclosure.

FIG. 7 is a diagram 700 illustrating an example of a transition from a first resource pool to a second resource pool, in accordance with some aspects of the present disclosure. As illustrated in in FIG. 7, a first device (e.g., the device 504(1)) may transmit a SCI 702 including a sidelink bandwidth configuration message (e.g., a sidelink bandwidth configuration message 506) to a second device (e.g., the device 504(2)) over the first resource pool 704, which is currently the primary resource pool for the second device. The sidelink bandwidth configuration message may instruct the second device to switch to having a second resource pool 706 as the primary resource pool. In response to the SCI 702, the second device may transmit an acknowledgment 708 to the first UE over the first resource pool 704. Further, the first device and the second device may be configured to perform the switch after a predefined period of time from the transmission of the acknowledgment 708. For example, after the predefined period of time from the transmission of the acknowledgment 708, the second device may employ the second resource pool 706 as the primary resource pool of the second device and the first device may deactivate the first resource pool 704, as described herein to save power and reduce bandwidth usage.

Figure 8:
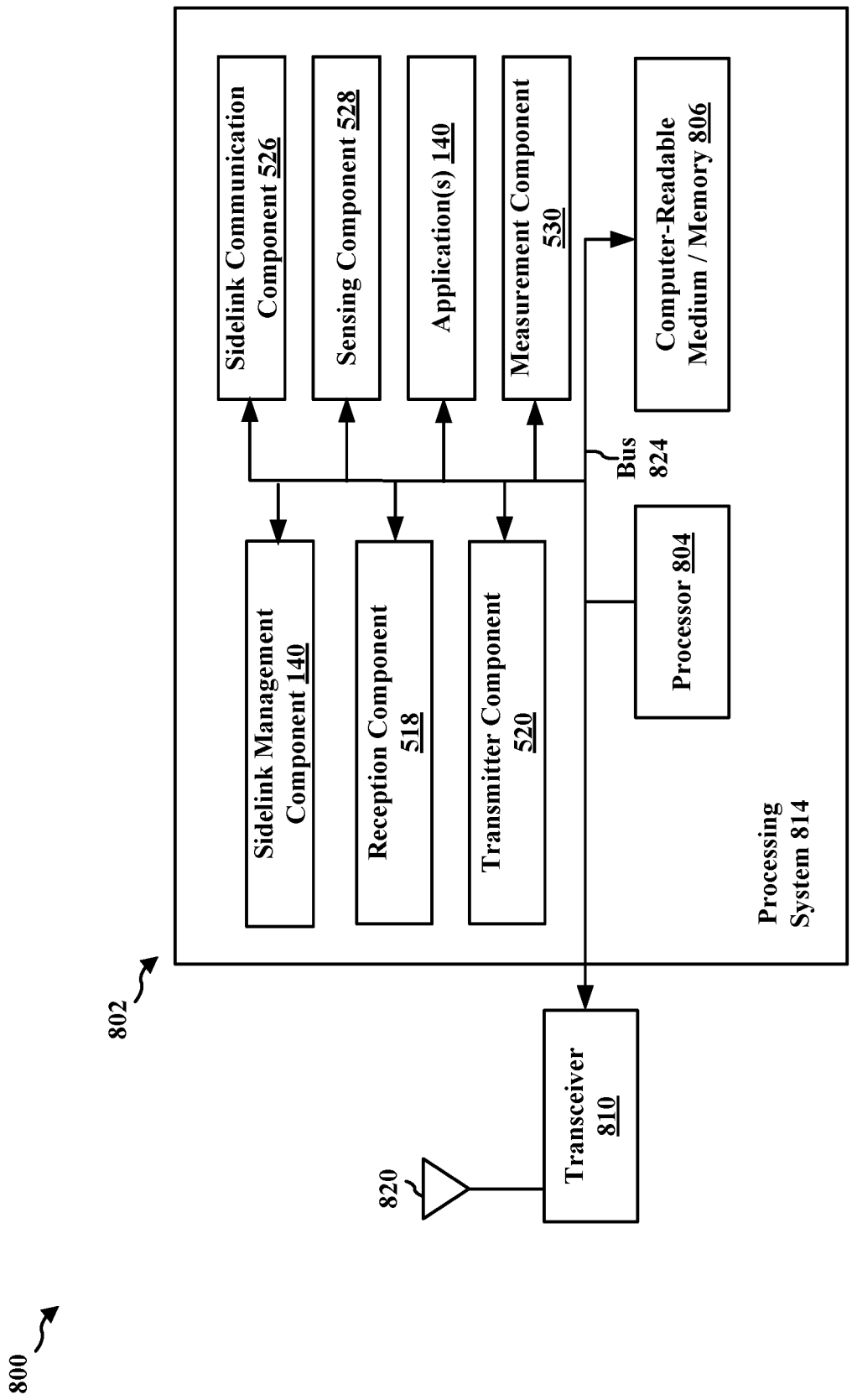
FIG. 8 is a diagram illustrating an example of a hardware implementation for a device employing a processing system, in accordance with some aspects of the present disclosure.

FIG. 8 is a diagram 800 illustrating an example of a hardware implementation for a device 802 (e.g., the UE 104, the device 504, etc.) employing a processing system 814. The processing system 814 may be implemented with a bus architecture, represented generally by the bus 824. The bus 824 may include any number of interconnecting buses and/or bridges depending on the specific application of the processing system 814 and the overall design constraints. The bus 824 links together various circuits including one or more processors and/or hardware components, represented by the processor 804, the sidelink management component 140, the application(s) 526, the sidelink communication component 516, the sensing component 528, the measurement component 530, and the computer-readable medium (e.g., non-transitory computer-readable medium)/memory 806. The bus 824 may also link various other circuits such as timing sources, peripherals, voltage regulators, and power management circuits, which are well known in the art, and therefore, will not be described any further.

The processing system 814 may be coupled with a transceiver 810. The transceiver 810 may be coupled with one or more antennas 820. The transceiver 810 provides a means for communicating with various other apparatus over a transmission medium. The transceiver 810 receives a signal from the one or more antennas, extracts information from the received signal, and provides the extracted information to the processing system 814, specifically the reception component 518. The reception component 518 may receive the sidelink bandwidth configuration message 506, the recommendation information 508, the measurement information 510, and the acknowledgment 708. In addition, the transceiver 810 receives information from the processing system 814, specifically the transmitter component 520, and based on the received information, generates a signal to be applied to the one or more antennas. Further, the transmitter component 520 may transmit the sidelink bandwidth configuration message 506, the recommendation information 508, and the measurement information 510.

The processing system 814 includes a processor 804 coupled with a computer-readable medium/memory 806 (e.g., a non-transitory computer readable medium). The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the application(s) 526, the sidelink management component 140, the sidelink communication component 516, the sensing component 528, and the measurement component 530. The aforementioned components may be a software component running in the processor 804, resident/stored in the computer readable medium/memory 806, one or more hardware components coupled with the processor 804, or some combination thereof. The processing system 814 may be a component of the device 802 and may include the memory 360 and/or at least one of the TX processor 368, the RX processor 356, and the controller/processor 359. Alternatively, the processing system 814 may be the entire UE (e.g., see 350 of FIG. 3, device 504 of FIG. 5).

The aforementioned means may be one or more of the aforementioned components of the device 802 and/or the processing system 814 of device 802 configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
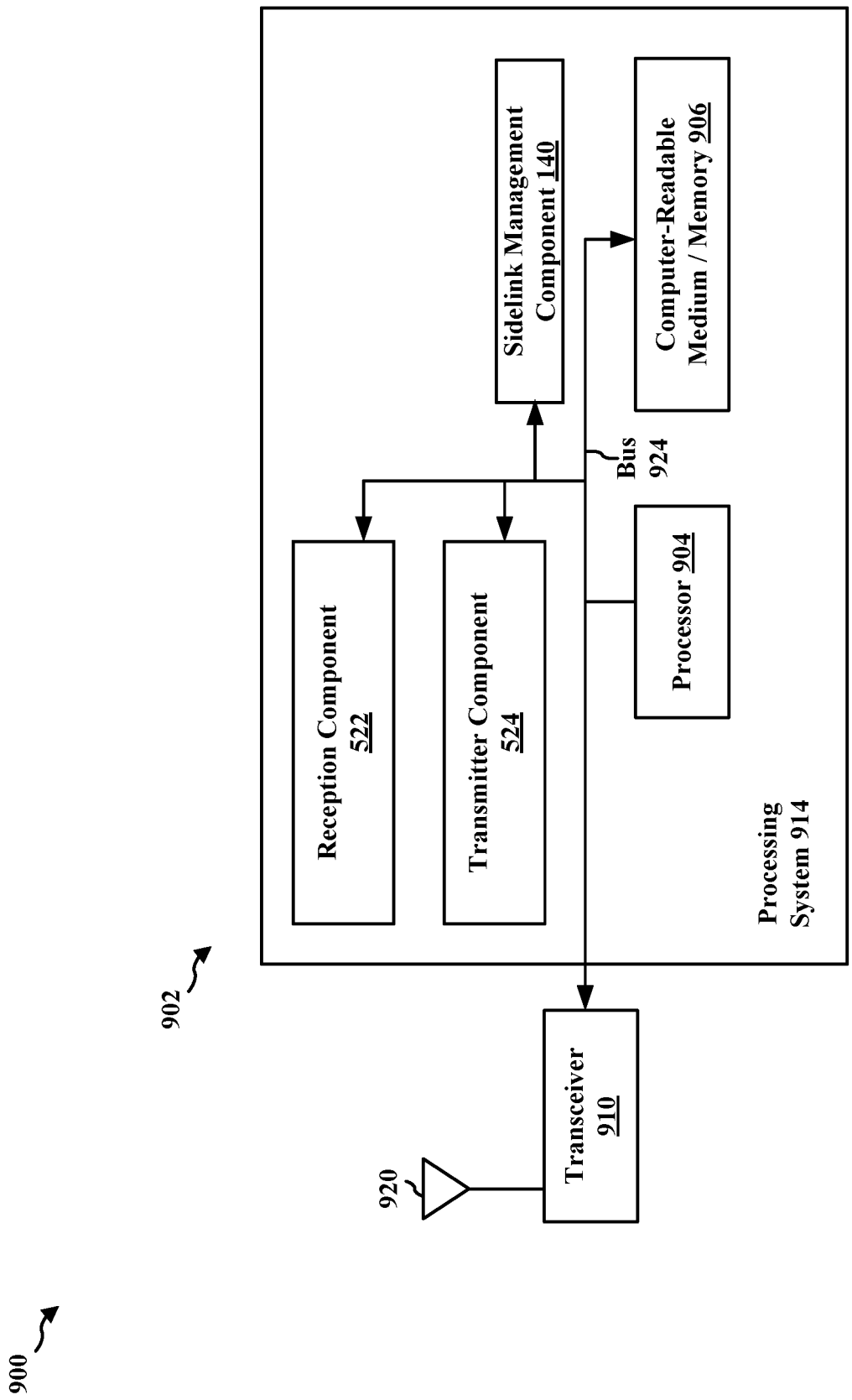
FIG. 9 is a diagram illustrating an example of a hardware implementation for a network entity employing a processing system, in accordance with some aspects of the present disclosure.

FIG. 9 is a diagram 900 illustrating an example of a hardware implementation for a network entity 902 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, sidelink management component 140, and the computer-readable medium/memory 906. The bus 924 may also link various other circuits such as timing sources, peripherals, voltage regulators, and power management circuits, which are well known in the art, and therefore, will not be described any further.

The processing system 914 may be coupled with a transceiver 910. The transceiver 910 is coupled with one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 522. The reception component 522 may receive the recommendation information 508(1)-(n) and the measurement information 510(1)-(n). In addition, the transceiver 910 receives information from the processing system 914, specifically the transmitter component 524, and based on the received information, generates a signal to be applied to the one or more antennas 920. Further, the transmitter component 524 may send the sidelink bandwidth configuration messages 506(1)-(n).

The processing system 914 includes a processor 904 coupled with a computer-readable medium/memory 906 (e.g., a non-transitory computer readable medium). The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes the sidelink management component 140. The aforementioned components may be software components running in the processor 904, resident/stored in the computer readable medium/memory 906, one or more hardware components coupled with the processor 904, or some combination thereof. The processing system 914 may be a component of the base station 310 and may include the memory 376 and/or at least one of the TX processor 316, the RX processor 370, and the controller/processor 375. Alternatively, the processing system 514 may be the entire base station (e.g., see 310 of FIG. 3, network entity 502 of FIG. 5).

The aforementioned means may be one or more of the aforementioned components of the network entity 902 and/or the processing system 914 of the network entity 902 configured to perform the functions recited by the aforementioned means. As described supra, the processing system 914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 10:
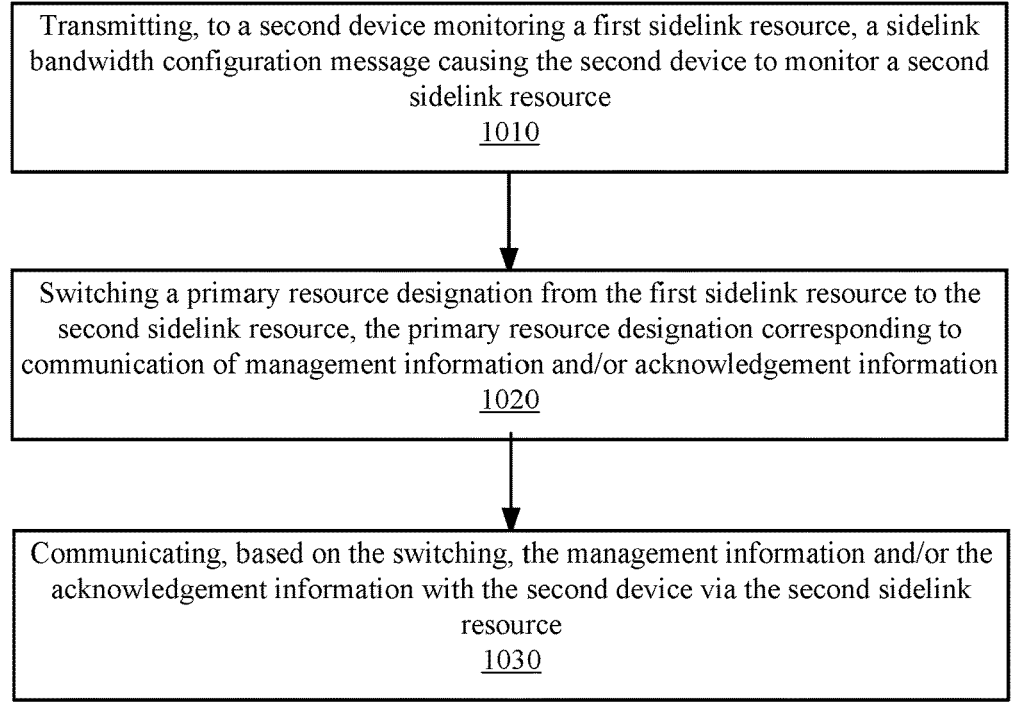
FIG. 10 is a flowchart of a first example method of resource pool and sidelink primary cell switching, in accordance with some aspects of the present disclosure.

FIG. 10 is a flowchart of a method 1000 of resource pool and sidelink primary cell switching. The method may be performed by a UE (e.g., the UE 104 of FIGS. 1 and 3, which may include the memory 360 and which may be the entire UE 104 or a component of the UE 104, such as the sidelink management component 140, the TX processor 368, the RX processor 356, and/or the controller/processor 359; the device 504 of FIG. 5; and/or the device 802 of FIG. 8).

At block 1010, the method 1000 may include transmitting, to a second device monitoring a first sidelink resource, a sidelink bandwidth configuration message causing the second device to monitor a second sidelink resource. For example, the device 504(1) may transmit the sidelink bandwidth configuration message 506 via layer-1 signaling, layer-2 signaling, or layer-3 signaling transmitted on a primary resource pool or a second resource pool. Further, the sidelink bandwidth configuration message 506 may instruct the device 504(2) to switch to the resource pool or the primary cell of the device 504(2).

Accordingly, the UE 104, the device 504, device 802, the TX processor 368, the RX processor 356, and/or the controller/processor 359, executing the sidelink management component 140 may provide means for transmitting, to a second device monitoring a first sidelink resource, a sidelink bandwidth configuration message causing the second device to monitor a second sidelink resource.

At block 1020, the method 1000 may include switching a primary resource designation from the first sidelink resource to the second sidelink resource, the primary resource designation corresponding to communication of management information and/or acknowledgement information. For example, the device 504(1) may switch the primary resource pool of the device 504(2) from a first resource pool of the CC to a second resource pool. Further, once the primary resource pool of the device 504(2) has been switched, the device 504(1) may deactivate the first resource pool, thereby saving power that would have been consumed to provide the first resource pool and freeing up bandwidth.

Accordingly, the UE 104, the device 504, device 802, the TX processor 368, the RX processor 356, and/or the controller/processor 359 executing the sidelink management component 140 may provide means for switching a primary resource designation from the first sidelink resource to the second sidelink resource, the primary resource designation corresponding to communication of management information and/or acknowledgement information.

At block 1030, the method 1000 may include communicating, based on the switching, the management information and/or the acknowledgement information with the second device via the second sidelink resource. For example, the devices 504(1) and 504(2) may transmit and receive the communications 514(1)-(n) via the second resource pool.

Accordingly, the UE 104, the device 504, device 802, the TX processor 368, the RX processor 356, and/or the controller/processor 359 executing the sidelink management component 140 and/or the sidelink communication component 516 may provide means for communicating, based on the switching, the management information and/or the acknowledgement information with the second device via the second sidelink resource.

Figure 11:
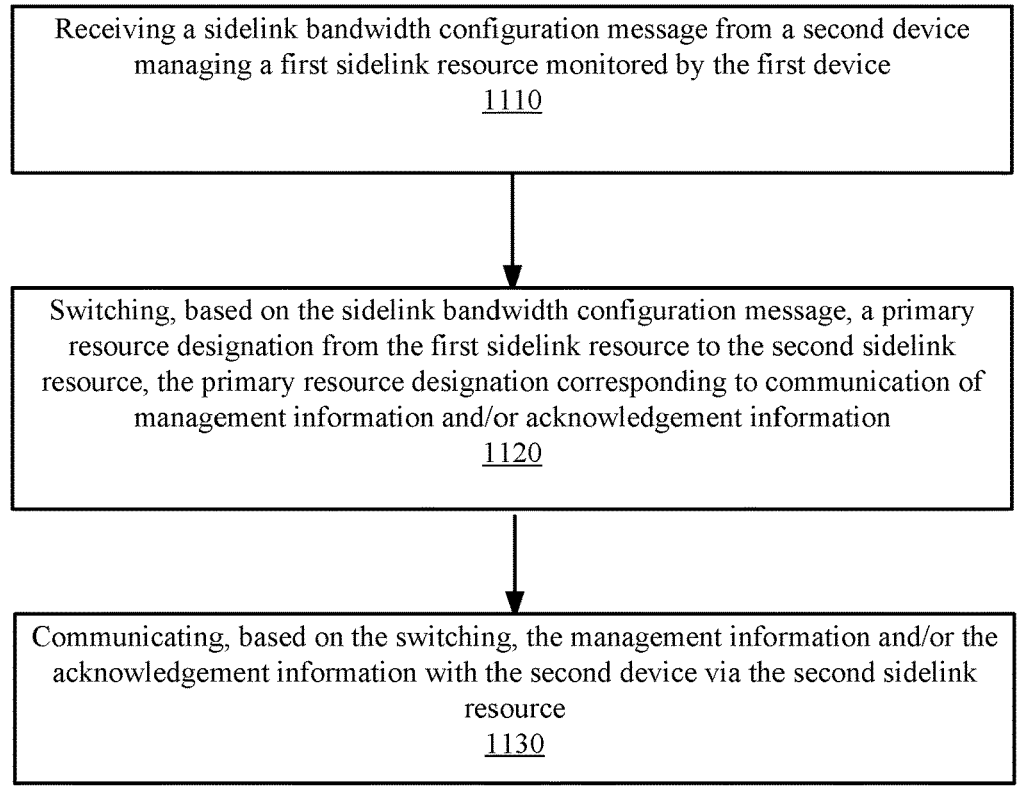
FIG. 11 is a flowchart of a second example method of resource pool and sidelink primary cell switching, in accordance with some aspects of the present disclosure.

FIG. 11 is a flowchart of a method 1100 of resource pool and sidelink primary cell switching. The method may be performed by a UE (e.g., the UE 104 of FIGS. 1 and 3, which may include the memory 360 and which may be the entire UE 104 or a component of the UE 104, such as sidelink communication component 516, the TX processor 368, the RX processor 356, and/or the controller/processor 359; the device 504 of FIG. 5; and/or the device 802 of FIG. 8).

At block 1110, the method 1100 may include receiving a sidelink bandwidth configuration message from a second device managing a first sidelink resource monitored by the first device. For example, the device 504(1) may receive the sidelink bandwidth configuration message 506 via layer-1 signaling, layer-2 signaling, or layer-3 signaling transmitted on a primary resource pool or a second resource pool. Further, the sidelink bandwidth configuration message 506 may include instructions for the device 504(2) to switch the primary resource pool or the primary cell of the device 504(2) to a resource pool or a cell identified within the sidelink bandwidth configuration message 506.

Accordingly, the UE 104, the device 504, device 802, the TX processor 368, the RX processor 356, and/or the controller/processor 359, executing the sidelink communication component 516 may provide means for receiving a sidelink bandwidth configuration message from a second device managing a first sidelink resource monitored by the first device.

At block 1120, the method 1100 may include switching, based on the sidelink bandwidth configuration message, a primary resource designation from the first sidelink resource to the second sidelink resource, the primary resource designation corresponding to communication of management information and/or acknowledgement information. For example, the device 504(2) may switch the primary resource pool or the primary cell of the device 504(2) based on the sidelink bandwidth configuration message 506.

Accordingly, the UE 104, the device 504, device 802, the TX processor 368, the RX processor 356, and/or the controller/processor 359 executing the sidelink communication component 516 may provide means for switching, based on the sidelink bandwidth configuration message, a primary resource designation from the first sidelink resource to the second sidelink resource, the primary resource designation corresponding to communication of management information and/or acknowledgement information.

At block 1130, the method 1100 may include communicating, based on the switching, the management information and/or the acknowledgement information with the second device via the second sidelink resource. For example, the devices 504(1) and 504(2) may transmit and receive the communications 514(1)-(n) via the second resource pool.

Accordingly, the UE 104, the device 504, device 802, the TX processor 368, the RX processor 356, and/or the controller/processor 359 executing the sidelink communication component 516 may provide means for communicating, based on the switching, the management information and/or the acknowledgement information with the second device via the second sidelink resource.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a first device, comprising: transmitting, to a second device monitoring a first sidelink resource, a sidelink bandwidth configuration message causing the second device to monitor a second sidelink resource; switching a primary resource designation from the first sidelink resource to the second sidelink resource, the primary resource designation corresponding to communication of management information and/or acknowledgement information; and communicating, based on the switching, the management information and/or the acknowledgement information with the second device via the second sidelink resource.

B. The method as paragraph A recites, wherein the first sidelink resource is a first sidelink cell and the second sidelink resource is a second sidelink cell, and switching the primary resource designation from the first sidelink resource to the second sidelink resource comprises switching a primary cell designation of the second device to the second sidelink cell from the first sidelink cell.

C. The method as paragraph A recites, wherein the first sidelink resource is a first resource pool and the second sidelink resource is a second resource pool, and switching the primary resource designation from the first sidelink resource to the second sidelink resource comprises switching a primary resource pool designation of the second device to the second resource pool from the first resource pool for a primary cell and at least one secondary cell.

D. The method as any of paragraphs A-C recite, wherein the primary resource designation is a first primary resource pool designation of a primary cell, and further comprising: assigning, to a third resource pool based on the switching, a second primary resource pool designation of a secondary cell, wherein the third resource pool belongs to a sidelink cell other than the primary cell.

E. The method as any of paragraphs A-D recite, wherein transmitting the sidelink bandwidth configuration message comprises transmitting, to the second device, the sidelink bandwidth configuration message via a primary resource pool or secondary resource pool assigned to the second device using layer-1 signaling, layer-2 signaling, or layer-3 signaling.

F. The method as any of paragraphs A-D recite, wherein transmitting the sidelink bandwidth configuration message comprises transmitting, to the second device, the sidelink bandwidth configuration message via radio resource control (RRC) signaling.

G. The method as any of paragraphs A-D recite, wherein transmitting the sidelink bandwidth configuration message comprises transmitting, to the second device, the sidelink bandwidth configuration message within sidelink control information (SCI).

H. The method as any of paragraphs A-D recite, wherein transmitting the sidelink bandwidth configuration message comprises transmitting, to the second device, the sidelink bandwidth configuration message via a physical sidelink shared channel (PSSCH).

I. The method as any of paragraphs A-H recite, wherein switching the primary resource designation from the first sidelink resource to the second sidelink resource comprises deactivating the first sidelink resource for communication of the management information and/or the acknowledgement information.

J. The method as any of paragraphs A-H recite, wherein switching the primary resource designation from the first sidelink resource to the second sidelink resource comprises: receiving, from the second device, an acknowledgement to the sidelink bandwidth configuration message; and assigning the primary resource designation to the second sidelink resource at a predefined time after receipt of the acknowledgement.

K. The method as any of paragraphs A-J recite, further comprising receiving, from a network entity, resource configuration information identifying the second sidelink resource, and wherein switching the primary resource designation from the first sidelink resource to the second sidelink resource comprises switching the primary resource designation from the first sidelink resource to the second sidelink resource based at least in part on the resource configuration information.

L. The method as any of paragraphs A-K recite, further comprising receiving, from the second device, recommendation information identifying the second sidelink resource, and wherein switching the primary resource designation from the first sidelink resource to the second sidelink resource comprises switching the primary resource designation from the first sidelink resource to the second sidelink resource based at least in part on the recommendation information.

M. The method as any of paragraphs A-L recite, further comprising receiving, from the second device, measurement information associated with the second sidelink resource, and wherein switching the primary resource designation from the first sidelink resource to the second sidelink resource comprises switching the primary resource designation from the first sidelink resource to the second sidelink resource based at least in part on the measurement information.

N. The method as any of paragraphs A-M recite, wherein the UE is a 5G NR wireless equipment device.

O. A user equipment for wireless communication, comprising a memory storing computer-executable instructions; and at least one processor coupled with the memory and configured to execute the computer-executable instructions to perform the method of any of claims A-N.

P. A user equipment for wireless communication, comprising means for performing the method of any of claims A-N.

Q. A non-transitory computer-readable medium storing computer executable code, the code when executed by a processor causes the processor to perform the method of any of claims A-N.

R. A method of wireless communication at a first device, comprising: receiving a sidelink bandwidth configuration message from a second device managing a first sidelink resource monitored by the first device; switching, based on the sidelink bandwidth configuration message, a primary resource designation from the first sidelink resource to a second sidelink resource, the primary resource designation corresponding to communication of management information and/or acknowledgement information; and communicating, based on the switching, the management information and/or the acknowledgement information with the second device via the second sidelink resource.

S. The method as paragraph R recites, wherein the first sidelink resource is a first sidelink cell and the second sidelink resource is a second sidelink cell, and switching the primary resource designation from the first sidelink resource to the second sidelink resource comprises switching a primary cell designation of the second device to the second sidelink cell from the first sidelink cell.

T. The method as paragraph R recites, wherein the first sidelink resource is a first resource pool and the second sidelink resource is a second resource pool, and switching the primary resource designation from the first sidelink resource to the second sidelink resource comprises switching a primary resource pool designation of the second device to the second resource pool from the first resource pool for a primary cell and at least one secondary cell.

U. The method as any of paragraphs R-T recite, wherein receiving the sidelink bandwidth configuration message comprises transmitting, to the second device, the sidelink bandwidth configuration message via a primary resource pool or secondary resource pool assigned to the second device using layer-1 signaling, layer-2 signaling, or layer-3 signaling.

V. The method as any of paragraphs R-U recite, wherein switching the primary resource designation from the first sidelink resource to the second sidelink resource comprises suspending monitoring of the first sidelink resource for communication of the management information and/or the acknowledgement information.

W. The method as any of paragraphs R-V recite, wherein switching the primary resource designation from the first sidelink resource to the second sidelink resource comprises: sending, to the second device, an acknowledgement to the sidelink bandwidth configuration message; and monitoring the second sidelink resource at a predefined time after receipt of the acknowledgement.

X. The method as any of paragraphs R-W recite, further comprising sending, to the second device, recommendation information identifying the second sidelink resource, and wherein the second device selects the second sidelink resource as the primary resource designation based on the recommendation information.

Y. The method as any of paragraphs R-X recite, further comprising sending, to the second device, measurement information associated with the second sidelink resource, and wherein switching the primary resource designation from the first sidelink resource to the second sidelink resource comprises switching the primary resource designation from the first sidelink resource to the second sidelink resource based at least in part on the measurement information.

Z. The method as any of paragraphs R-Y recite, wherein the UE is a 5G NR wireless equipment device.

AA. A user equipment for wireless communication, comprising a memory storing computer-executable instructions; and at least one processor coupled with the memory and configured to execute the computer-executable instructions to perform the method of any of claims R-Z.

AB. A user equipment for wireless communication, comprising means for performing the method of any of claims R-Z.

AC. A non-transitory computer-readable medium storing computer executable code, the code when executed by a processor causes the processor to perform the method of any of claims R-Z.

What is claimed is:

1. A method of wireless communication at a first device comprising:
    transmitting, to a second device monitoring a first sidelink resource, a sidelink bandwidth configuration message causing the second device to monitor a second sidelink resource;
    switching a primary resource designation from the first sidelink resource to the second sidelink resource, the primary resource designation corresponding to communication of management information and/or acknowledgement information; and
    communicating, based on the switching, the management information and/or the acknowledgement information with the second device via the second sidelink resource,
    wherein:
        the first sidelink resource is a first sidelink cell and the second sidelink resource is a second sidelink cell, and switching the primary resource designation from the first sidelink resource to the second sidelink resource comprises switching a primary cell designation of the second device to the second sidelink cell from the first sidelink cell, or
        the first sidelink resource is a first resource pool and the second sidelink resource is a second resource pool, and switching the primary resource designation from the first sidelink resource to the second sidelink resource comprises switching a primary resource pool designation of the second device to the second resource pool from the first resource pool for a primary cell and at least one secondary cell, or
        the primary resource designation is a first primary resource pool designation of a primary cell, and further comprising: assigning, to a third resource pool based on the switching, a second primary resource pool designation of a secondary cell, wherein the third resource pool belongs to a sidelink cell other than the primary cell, or
        switching the primary resource designation from the first sidelink resource to the second sidelink resource comprises deactivating the first sidelink resource for communication of the management information and/or the acknowledgement information, or
        switching the primary resource designation from the first sidelink resource to the second sidelink resource comprises: receiving, from the second device, an acknowledgement to the sidelink bandwidth configuration message; and assigning the primary resource designation to the second sidelink resource at a predefined time after receipt of the acknowledgement.

2. The method of claim 1, wherein transmitting the sidelink bandwidth configuration message comprises transmitting, to the second device, the sidelink bandwidth configuration message via a primary resource pool or secondary resource pool assigned to the second device using layer-1 signaling, layer-2 signaling, or layer-3 signaling.

3. The method of claim 1, wherein transmitting the sidelink bandwidth configuration message comprises transmitting, to the second device, the sidelink bandwidth configuration message via radio resource control (RRC) signaling.

4. The method of claim 1, wherein transmitting the sidelink bandwidth configuration message comprises transmitting, to the second device, the sidelink bandwidth configuration message within sidelink control information (SCI).

5. The method of claim 1, wherein transmitting the sidelink bandwidth configuration message comprises transmitting, to the second device, the sidelink bandwidth configuration message via a physical sidelink shared channel (PSSCH).

6. The method of claim 1, further comprising receiving, from a network entity, resource configuration information identifying the second sidelink resource, and wherein switching the primary resource designation from the first sidelink resource to the second sidelink resource comprises switching the primary resource designation from the first sidelink resource to the second sidelink resource based at least in part on the resource configuration information.

7. The method of claim 1, further comprising receiving, from the second device, recommendation information identifying the second sidelink resource, and wherein switching the primary resource designation from the first sidelink resource to the second sidelink resource comprises switching the primary resource designation from the first sidelink resource to the second sidelink resource based at least in part on the recommendation information.

8. The method of claim 1, further comprising receiving, from the second device, measurement information associated with the second sidelink resource, and wherein switching the primary resource designation from the first sidelink resource to the second sidelink resource comprises switching the primary resource designation from the first sidelink resource to the second sidelink resource based at least in part on the measurement information.

9. A first device for wireless communication, comprising:
a memory storing computer-executable instructions; and
at least one processor coupled with the memory and configured to execute the computer-executable instructions to:
transmit, to a second device monitoring a first sidelink resource, a sidelink bandwidth configuration message causing the second device to monitor a second sidelink resource;
switch a primary resource designation from the first sidelink resource to the second sidelink resource, the primary resource designation corresponding to communication of management information and/or acknowledgement information; and
communicate, based on the switching, the management information and/or the acknowledgement information with the second device via the second sidelink resource, wherein:
the first sidelink resource is a first sidelink cell and the second sidelink resource is a second sidelink cell, and to switch the primary resource designation from the first sidelink resource to the second sidelink resource, the at least one processor is further configured to: switch a primary cell designation of the second device to the second sidelink cell from the first sidelink cell, or
the first sidelink resource is a first resource pool and the second sidelink resource is a second resource pool, and to switch the primary resource designation from the first sidelink resource to the second sidelink resource, the at least one processor is further configured to: switch a primary resource pool designation of the second device to the second resource pool from the first resource pool for a primary cell and at least one secondary cell, or
the primary resource designation is a first primary resource pool designation of a primary cell, and the at least one processor is further configured to: assign, to a third resource pool based on the switching, a second primary resource pool designation of a secondary cell, wherein the third resource pool belongs to a sidelink cell other than the primary cell, or
to switch the primary resource designation from the first sidelink resource to the second sidelink resource, the at least one processor is further configured to: deactivate the first sidelink resource for communication of the management information and/or the acknowledgement information, or
to switch the primary resource designation from the first sidelink resource to the second sidelink resource, the at least one processor is further configured to: receive, from the second device, an acknowledgement to the sidelink bandwidth configuration message; and assign the primary resource designation to the second sidelink resource at a predefined time after receipt of the acknowledgement.

10. The first device of claim 9, wherein to transmit the sidelink bandwidth configuration message, the at least one processor is further configured to:
transmit, to the second device, the sidelink bandwidth configuration message via a primary resource pool or secondary resource pool assigned to the second device using layer-1 signaling, layer-2 signaling, or layer-3 signaling.

11. A method of wireless communication at a first device comprising:
receiving a sidelink bandwidth configuration message from a second device managing a first sidelink resource monitored by the first device;
switching, based on the sidelink bandwidth configuration message, a primary resource designation from the first sidelink resource to a second sidelink resource, the primary resource designation corresponding to communication of management information and/or acknowledgement information; and
communicating, based on the switching,
the management information with the second device via the second sidelink resource, or
the management information and the acknowledgement information with the second device via the second sidelink resource, wherein:
the first sidelink resource is a first sidelink cell and the second sidelink resource is a second sidelink cell, and switching the primary resource designation from the first sidelink resource to the second sidelink resource comprises switching a primary cell designation of the second device to the second sidelink cell from the first sidelink cell, or
the first sidelink resource is a first resource pool and the second sidelink resource is a second resource pool, and switching the primary resource designation from the first sidelink resource to the second sidelink resource comprises switching a primary resource pool designation of the second device to the second resource pool from the first resource pool for a primary cell and at least one secondary cell, or
switching the primary resource designation from the first sidelink resource to the second sidelink resource comprises suspending monitoring of the first sidelink resource for communication of the management information and/or the acknowledgement information, or
switching the primary resource designation from the first sidelink resource to the second sidelink resource comprises: sending, to the second device, an acknowledgement to the sidelink bandwidth configuration message; and monitoring the second sidelink resource at a predefined time after receipt of the acknowledgement, or
further comprising sending, to the second device, recommendation information identifying the second sidelink resource, and wherein the second device selects the second sidelink resource as the primary resource designation based on the recommendation information, or
further comprising sending, to the second device, measurement information associated with the second sidelink resource, and wherein switching the primary resource designation from the first sidelink resource to the second sidelink resource comprises switching the primary resource designation from the first sidelink resource to the second sidelink resource based at least in part on the measurement information.

12. The method of claim 11, wherein receiving the sidelink bandwidth configuration message comprises transmitting, to the second device, the sidelink bandwidth configuration message via a primary resource pool or secondary resource pool assigned to the second device using layer-1 signaling, layer-2 signaling, or layer-3 signaling.

13. A first device for wireless communication, comprising:
a memory storing computer-executable instructions; and
at least one processor coupled with the memory and configured to execute the computer-executable instructions to:
receive a sidelink bandwidth configuration message from a second device managing a first sidelink resource monitored by the first device,
switch, based on the sidelink bandwidth configuration message, a primary resource designation from the first sidelink resource to a second sidelink resource, the primary resource designation corresponding to communication of management information and/or acknowledgement information; and
communicate, based on the switching,
the management information with the second device via the second sidelink resource, or
the management information and the acknowledgement information with the second device via the second sidelink resource,
wherein:
the first sidelink resource is a first sidelink cell and the second sidelink resource is a second sidelink cell, and switching the primary resource designation from the first sidelink resource to the second sidelink resource comprises switching a primary cell designation of the second device to the second sidelink cell from the first sidelink cell, or
the first sidelink resource is a first resource pool and the second sidelink resource is a second resource pool, and switching the primary resource designation from the first sidelink resource to the second sidelink resource comprises switching a primary resource pool designation of the second device to the second resource pool from the first resource pool for a primary cell and at least one secondary cell, or
to switch the primary resource designation from the first sidelink resource to the second sidelink resource, the at least one processor is further configured to: suspend monitoring of the first sidelink resource for communication of the management information and/or the acknowledgement information,
to switch the primary resource designation from the first sidelink resource to the second sidelink resource, the at least one processor is further configured to: send, to the second device, an acknowledgement to the sidelink bandwidth configuration message; and monitor the second sidelink resource at a predefined time after receipt of the acknowledgement, or
the at least one processor is further configured to: send to the second device, recommendation information identifying the second sidelink resource, and wherein the second device selects the second sidelink resource as the primary resource designation based on the recommendation information, or
the at least one processor is further configured to: send to the second device, measurement information associated with the second sidelink resource, and wherein switching the primary resource designation from the first sidelink resource to the second sidelink resource comprises switching the primary resource designation from the first sidelink resource to the second sidelink resource based at least in part on the measurement information.

14. The first device of claim 13, wherein receiving the sidelink bandwidth configuration message comprises transmitting, to the second device, the sidelink bandwidth configuration message via a primary resource pool or secondary resource pool assigned to the second device using layer-1 signaling, layer-2 signaling, or layer-3 signaling.

* * * * *